United States Patent
Cheng et al.

(10) Patent No.: US 8,149,905 B1
(45) Date of Patent: Apr. 3, 2012

(54) SYSTEM AND METHOD FOR DOPPLER FREQUENCY ESTIMATION

(75) Inventors: Hao-Ren Cheng, Yuanli Township (TW); Gaspar Lee, Bade (TW); Chih-Yuan Chu, Hsinchu (TW)

(73) Assignee: Qualcomm Atheros, Inc., San Jose, CA (US)

( * ) Notice: Subject to any disclaimer, the term of this patent is extended or adjusted under 35 U.S.C. 154(b) by 723 days.

(21) Appl. No.: 12/277,247

(22) Filed: Nov. 24, 2008

(51) Int. Cl.
*H04B 3/46* (2006.01)
*H04B 17/00* (2006.01)
*H04Q 1/20* (2006.01)

(52) U.S. Cl. .................................. 375/224; 375/340

(58) Field of Classification Search .................. 375/224, 375/229, 285, 340, 344, 346, 350; 455/75; 342/904; 370/206
See application file for complete search history.

(56) References Cited

U.S. PATENT DOCUMENTS

| | | | |
|---|---|---|---|
| 6,928,274 B2 | 8/2005 | Da Rocha et al. | |
| 7,599,453 B2 * | 10/2009 | Wilhelmsson | 375/344 |
| 7,940,848 B2 | 5/2011 | Fechtel | |
| 2002/0042279 A1 | 4/2002 | Da Rocha et al. | |
| 2007/0211827 A1 * | 9/2007 | Baggen et al. | 375/316 |
| 2007/0297522 A1 * | 12/2007 | Baggen et al. | 375/260 |
| 2008/0089395 A1 * | 4/2008 | Cairns | 375/148 |
| 2008/0130674 A1 | 6/2008 | Ahmed-Ouameur et al. | |
| 2008/0240265 A1 | 10/2008 | Fechtel | |
| 2009/0067520 A1 * | 3/2009 | Gallizio et al. | 375/260 |
| 2009/0129493 A1 | 5/2009 | Zhang et al. | |
| 2010/0040154 A1 * | 2/2010 | Carbonelli et al. | 375/260 |

* cited by examiner

*Primary Examiner* — Jean B Corrielus
(74) *Attorney, Agent, or Firm* — Bever, Hoffman & Harms, LLP

(57) ABSTRACT

A method and apparatus in a multiple sub-carrier digital communication receiver estimates a Doppler frequency bandwidth. The Doppler frequency bandwidth is estimated by comparing a first set of channel estimates to a second set of channel estimates generated by Wiener filter interpolation of the first set of channel estimates. The Wiener interpolation filter coefficients are generated for various Doppler frequency bandwidths. Pre-determined transmit pilot symbols may be used to generate the first set of channel estimates in an OFDM communication system. A set of Wiener filter interpolation errors may be generated at one or more sub-carrier frequencies, for each of the different Doppler frequency bandwidths, and averaged across time and/or frequency. The Doppler frequency estimation method and apparatus may select a Doppler frequency estimate based on the set of Wiener filter interpolation errors.

22 Claims, 12 Drawing Sheets

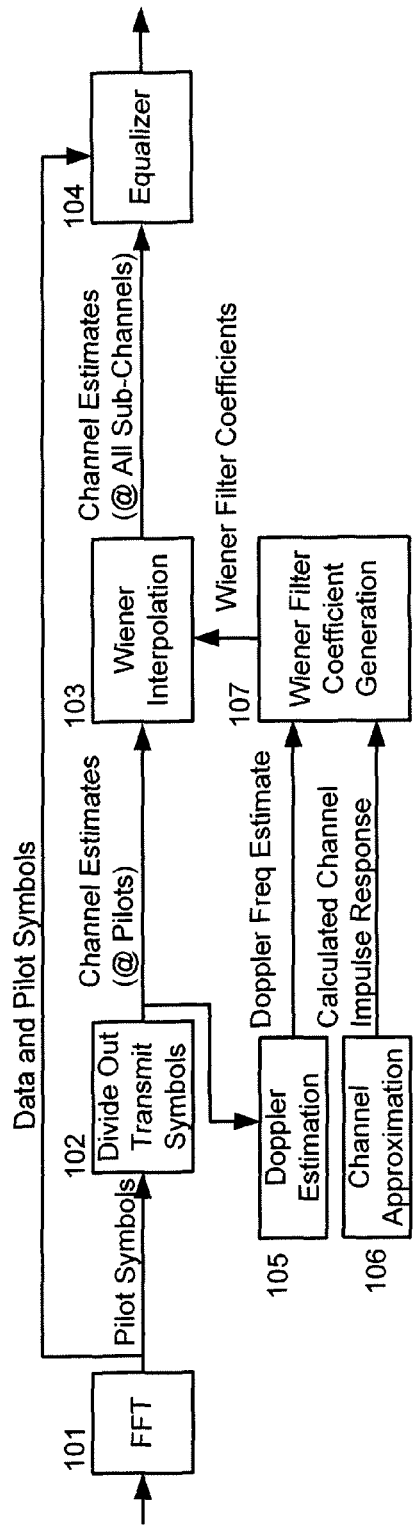
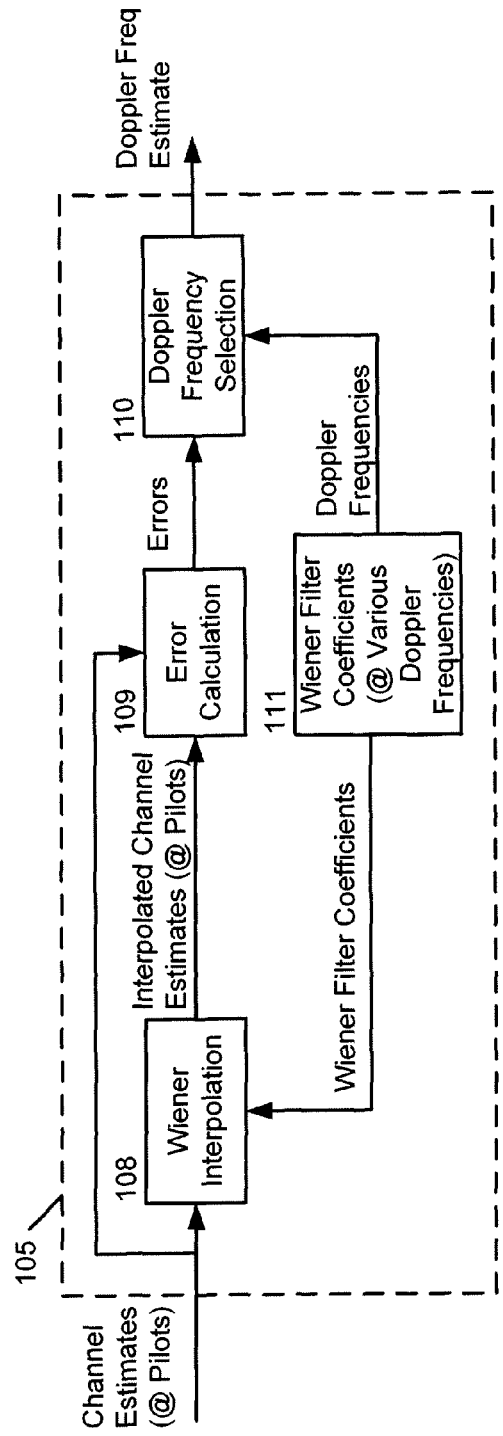
Figure 1A
Figure 1B

901
Pilot Only Sampled Delay
Doppler Spread Function
Wide $\tau_{max}$ (Top View)

1001
Pilot Only Sampled Delay
Doppler Spread Function
Narrow T$_{max}$ (Top View)

1301
Pilot Only Sampled Delay
Doppler Spread Function
Dual Station (Top View)

Station A (Solid)
Station B (Dashed)

SYSTEM AND METHOD FOR DOPPLER FREQUENCY ESTIMATION

CROSS REFERENCE TO RELATED APPLICATION

This application is related to commonly assigned, application Ser. No. 12/277,258, filed on Nov. 24, 2008, now U.S. Pat. No. 8,064,507, entitled "System and Method for Channel Estimation", by Hao-Ren Cheng, et al.

BACKGROUND OF THE INVENTION

1. Field of the Invention

Embodiments of the present invention generally relate to wireless digital communication systems that use multiple sub-carriers, and more particularly to systems and methods to estimate a Doppler frequency and a time-varying channel in a mobile wireless communications network.

2. Description of the Related Art

Advanced multimedia services continue to drive requirements for increasing data rates and higher performance in wireless systems. A multipath environment with time delay spread and a moving mobile environment with Doppler frequency spread provide challenges to high performance reception of high data rate signals. Digital communication systems that use multiple sub-carriers in parallel are becoming increasingly prevalent in order to offer good performance under varying noise conditions. For example the IEEE 802.11 wireless standards as well as the European digital audio broadcasting (DAB) and international digital video broadcasting handheld (DVB-H) standards employ a communication method known as Orthogonal Frequency Division Multiplexing (OFDM) to address multipath and other transmission impairments.

In an OFDM multiple sub-carrier system, a higher rate data signal may be divided among multiple narrowband sub-carriers that are orthogonal to one another in the frequency domain. The higher rate data signal may be transmitted as a set of parallel lower rate data signals each carried on a separate sub-carrier. In a wireless system, multipath may cause multiple versions of a transmitted data signal to arrive at a receiver with different delays, thereby resulting in inter-symbol interference created by received energy from different data signals transmitted at different times arriving at the receiver simultaneously. Each lower rate sub-carrier's symbol in an OFDM or DMT system may occupy a longer symbol period than in a higher rate single carrier system, and thus dispersion caused by multipath may be substantially contained within the longer symbol period, thereby reducing inter-symbol interference. Thus, OFDM may offer an effective technique to counter interference caused by multi-path fading.

Coherent detection, which may account for absolute phase and amplitude of the transmitted signal as used in quadrature amplitude modulation (QAM), provides better performance than non-coherent detection, which may only account for relative phase of the transmitted signal such as in differential phase shift keying (DPSK). Coherent detection may require knowledge of the changes induced on the transmitted signal by the intervening communication channel. As such, accurate channel estimation may be used to enable coherent detection.

When a multiple sub-carrier system transmits a set of symbols in parallel orthogonally, intervening transmission impairments may affect the orthogonality of the received sub-carrier symbols. To determine the effect of the transmission channel and impairments on receiver performance, the multiple sub-carrier system may send pre-determined transmit symbols, also known as "pilot" symbols, on a number of sub-carriers to estimate the channel. Specific sub-carriers to be used for pilot symbols may be fixed or may vary over time. For example, in an 802.11 system, four of the 52 orthogonal sub-carriers are dedicated as continuous "pilot" subcarriers; while in a DVB-H digital TV system, a number of different sub-carriers are used to transmit pilot symbols at regular intervals and transmit data symbols at other times.

Using an observed received symbol on a "pilot" sub-carrier with knowledge of an associated transmitted symbol, one may estimate a channel transfer characteristic at that sub-carrier frequency and during that OFDM symbol period. For channels that vary slowly in time, one may use selected sub-channel estimates at a sub-carrier frequency during a set of OFDM symbols to estimate the sub-channel at the same sub-carrier frequency for other OFDM symbols adjacent in time. Similarly for channels that vary slowly in frequency, one may use sub-channel estimates at a set of sub-carrier frequencies in a given OFDM symbol to estimate the sub-channel transfer characteristics at other sub-carrier frequencies in that same OFDM symbol. Forming a set of estimates based on a sample of estimates nearby in time or frequency is known as one-dimensional interpolation in time or frequency respectively. Forming an estimate of a sub-channel's transfer characteristic using sample estimates from a set of sub-channel estimates from different OFDM symbols and different sub-carrier frequencies is known as two-dimensional interpolation in both time and frequency.

Wiener filtering is a common form of interpolation used for channel estimation that minimizes the mean-square-error (MSE) of the estimates formed. A minimum MSE estimation Wiener filter may use knowledge of a correlation of the time-varying communication channel's frequency response in both the time domain and the frequency domain to estimate the channel's transfer characteristics. As the detailed statistics for a mobile wireless channel may be unknown, a Wiener filter may be designed using an approximation of the channel based on estimates of key variables such as the maximum echo delay, which may represent a spread in time, and a maximum Doppler frequency, which may represent the spread in frequency induced by the channel respectively.

While prior art methods exist to approximate a channel for Wiener filtering based on a maximum Doppler frequency and a maximum echo delay, these methods may not work well in at least two scenarios: (1) when the maximum Doppler frequency is small, i.e. the mobile is moving slowly or nearly stationary, and (2) when the maximum Doppler frequency is large, i.e. the mobile is moving quickly, and the maximum echo delay spread is also large. Some current techniques may use large amounts of memory and significant time to estimate a low maximum Doppler frequency. Known methods to interpolate channel estimates using a Wiener filter based on a relatively large echo delay for a mobile wireless receiver with a high maximum Doppler frequency may introduce high levels of aliased noise into the results thereby lowering performance. Thus, new methods to estimate the maximum Doppler frequency and to interpolate channel estimates are needed.

SUMMARY OF THE INVENTION

A method and apparatus in a multiple sub-carrier digital communication receiver estimates a Doppler frequency bandwidth. The Doppler frequency bandwidth is estimated by comparing a first set of channel estimates to a second set of channel estimates generated by Wiener filter interpolation of the first set of channel estimates. The Wiener interpolation filter coefficients are generated for various Doppler frequency bandwidths. Pre-determined transmit pilot symbols may be used to generate the first set of channel estimates in an OFDM communication system. A set of Wiener filter interpolation errors may be generated at one or more sub-carrier frequencies, for each of the different Doppler frequency bandwidths, and averaged across time and/or frequency. The Doppler frequency estimation method and apparatus may select a Doppler frequency estimate based on the set of Wiener filter interpolation errors.

BRIEF DESCRIPTION OF THE DRAWINGS

FIG. 1A illustrates select processing blocks in a digital communications OFDM receiver with channel estimation.

FIG. 1B illustrates a set of processing blocks in the Doppler frequency estimation block of FIG. 1A.

DETAILED DESCRIPTION

Unlike wired communication systems such as digital subscriber line (DSL) and cable modems, wireless communication systems may exhibit significant channel variations over shorter time periods. Channel estimation methods may enable a communication system to detect and adapt to these changes as they occur. Multicarrier systems, such as orthogonal frequency division multiplexing (OFDM), may provide receive samples across a set of frequencies in each successively received OFDM symbol. FIG. 1A illustrates select processing blocks in a digital communications OFDM receiver that includes channel estimation. A fast Fourier transform (FFT) block 101 may output a set of receive samples, one sample for each of a set of equally spaced frequency sub-channels, some of which may contain data symbols and others of which may contain so-called pilot symbols. The pilot symbols may contain a pre-determined pattern of values so that the receiver may ascertain the change induced by the intervening communication channel at the pilot sub-channel's frequency and at a particular time (i.e. during a particular OFDM symbol). The received pilot symbols may be divided (block 102) by the known pre-determined transmit symbol pattern to produce a set of channel estimates, one at each pilot sub-channel frequency during a particular OFDM symbol. These channel estimates may be input to a Wiener interpolation filter 103 that may provide channel estimates at data sub-channel frequencies (and at pilot sub-channel frequencies) for the same OFDM symbol or for other OFDM symbols.

Figure 2:
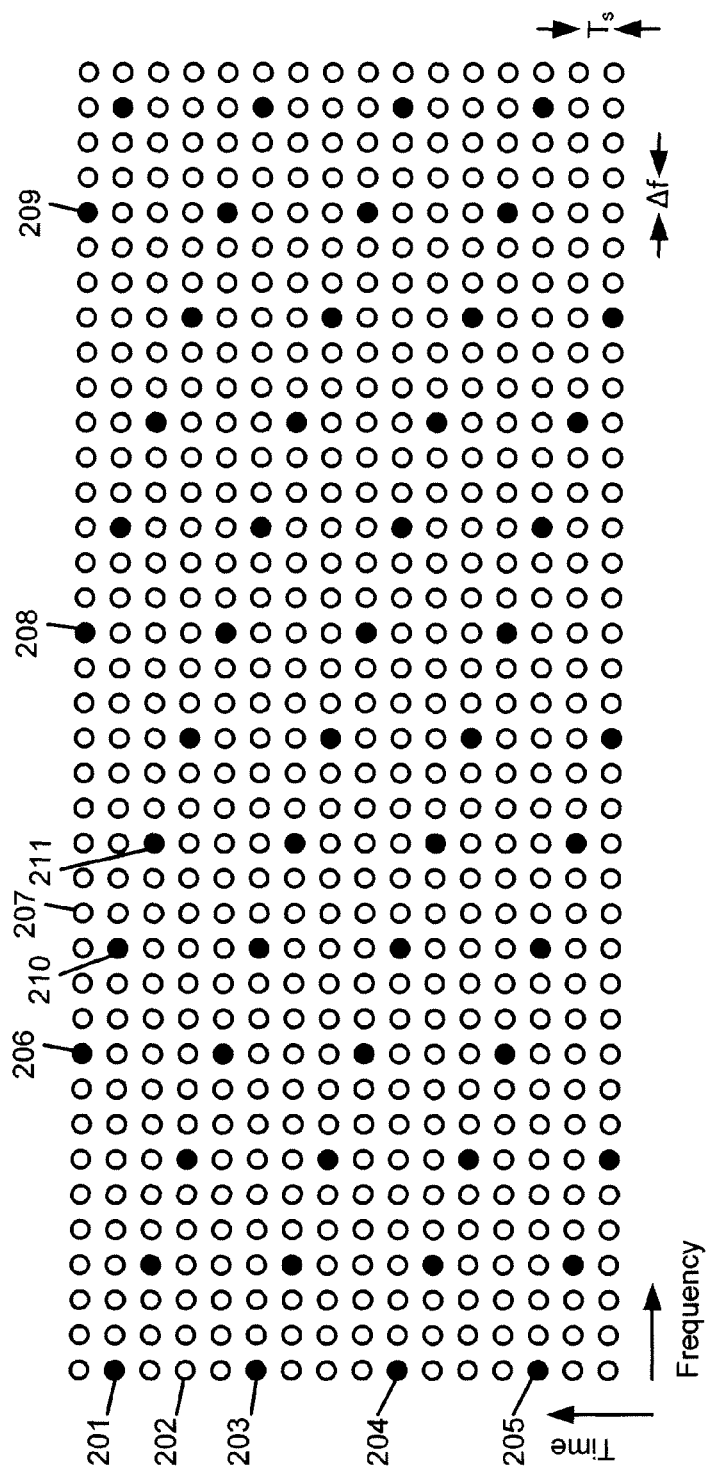
FIG. 2 illustrates a portion of the frame structure for an OFDM system using scattered pilots.

FIG. 2 illustrates a portion of the OFDM frame structure as a series of OFDM symbols in time (vertical axis) each consisting of a plurality of values at different sub-channel frequencies (horizontal axis). The OFDM symbols may be spaced apart $T_s=T_u+T_g$ units in time and the individual sub-channels in an OFDM symbol may be spaced apart $\Delta f=1/T_u$ units in frequency, where $T_u$ refers to a usable time period in an OFDM symbol and $T_g$ refers to an added guard interval. Data sub-channels are indicated by open dots, while pilot sub-channels are indicated by solid dots. Note that the pilot sub-channels may be scattered throughout the OFDM frame structure, as illustrated in FIG. 2 based on a portion of a frame structure used in a digital video broadcasting standard. Some communication systems may also use fixed pilots, which may have solid dots at one or more fixed sub-channel frequencies in every successive OFDM symbol, in addition to or instead of scattered pilots.

The Wiener interpolation filter 103 in FIG. 1A may use a number of interpolation methods to determine channel estimates. For example, a one-dimensional interpolation in time Wiener filter 103 may determine a channel estimate at sub-channel 202 using channel estimates at sub-channels 201 and 203. A one-dimensional interpolation in frequency Wiener filter 103 may determine a channel estimate at sub-channel 207 using channel estimates at sub-channels 206 and 208. Alternatively a two-dimensional interpolation in both time and frequency Wiener filter 103 may determine a channel estimate at sub-channel 207 using channel estimates at sub-channels 206, 210, 211 and 208.

The Wiener interpolation filter 103 may produce a set of channel estimates at all sub-channels, both pilot sub-channels and data sub-channels, that may then be used by an equalizer 104 to adjust the received pilot symbols and data symbols. For example, if the Wiener interpolation filter 103 estimates that a communication channel may modify a transmit symbol $x_i$ on sub-channel i by a sub-channel estimate $H_i$ that may result in a received symbol $y_i=H_ix_i$, the equalizer 104 may divide the received symbol $y_i$ by the sub-channel estimate $H_i$ to produce an estimate of the transmitted symbol. The Wiener interpolation filter 103 may use a set of filter coefficients that may depend on an estimate of the Doppler frequency and an estimate of the communication channel's impulse response characteristic. The Doppler frequency may correlate with the velocity of a mobile receiver with respect to a transmitting station, while the impulse response may estimate the multipath delays expected at the mobile receiver. As the time-varying channel impulse response may not be known in advance, an estimate of the channel impulse response may be determined using a channel approximation calculated in block 106 based on a statistical model for the channel. For example, in a mobile wireless communication system, different urban or rural environments may have known approximate impulse responses. A Doppler frequency estimate may be determined using the channel estimates derived from the pilot symbols, as shown in block 105.

FIG. 1B illustrates a set of processing blocks in the Doppler frequency estimation block 105 of FIG. 1A. The set of channel estimates generated by block 102 from the pilot symbols output by the FFT block 101 may be interpolated by a Wiener filter 108 to produce a second set of channel estimates. The second set of interpolated channel estimates at the pilot symbols may be compared to the input set of channel estimates by an error calculation block 109 resulting in a set of errors. Different Wiener interpolation filters 108 may be used to generate the second set of channel estimates; each of the different Wiener interpolation filters 108 using a different set of Wiener filter coefficients based on a different Doppler frequency bandwidth generated by block 111. A set of errors, one or more errors for each Doppler frequency bandwidth, may be used to select a Doppler frequency bandwidth estimate by block 110. Details of the Doppler frequency estimation method used in block 105 are described in the following text.

Given a continuous time (as opposed to discrete time), time-varying channel impulse response h(t,τ), the time-varying channel frequency response H(t,f) may be given as its Fourier transform $$H(t,f) \equiv \int_{-\infty}^{\infty} h(t,\tau) e^{-j2\pi f \tau} d\tau \quad (1)$$

An autocorrelation function $r_H(\Delta t, \Delta f)$ of the time-varying channel frequency response of a wide sense stationary channel may depend only on the difference in time and frequency rather than the absolute time and frequency values, and the autocorrelation function $r_H(\Delta t, \Delta f)$ may separate into a product of a time autocorrelation $r_t(\Delta t)$ and a frequency autocorrelation $r_f(\Delta f)$ as indicated in Equation (2).

$$r_H(\Delta t, \Delta f) = E\{H(t+\Delta t, f+\Delta f)H^*(t,f)\} = r_t(\Delta t)r_f(\Delta f) \quad (2)$$

The time autocorrelation $r_t(\Delta t)$ may depend on the Doppler frequency spread, which may depend on the mobile receiver velocity, while the frequency autocorrelation $r_f(\Delta f)$ may depend on the channel impulse response delay spread, which may depend on multi-path encountered.

For an OFDM discrete time communication system with an OFDM symbol time of $T_s$ and a sub-channel frequency spacing of $\Delta f$, a discrete time-frequency autocorrelation function $r_H[n,k]$ may be defined in Equation (3) based on the autocorrelation function of Equation (2) as $$r_H[n,k] = r_t(nT_s)r_f(k\Delta f) = r_t[n]r_f[k] \quad (3)$$

The discrete time autocorrelation $r_t[n]$ of Equation (3) may be estimated using channel estimates across different OFDM symbols, i.e. spaced in time, at the same frequency, i.e. on the same sub-channel. For example the discrete time autocorrelation $r_t[n]$ may be calculated for a time differential of n=Δm as in Equation (4).

$$r_t[\Delta m] = E\{H[m,]H^*[m+\Delta m,k]\}/E\{|H[0,k]|^2\} \quad (4)$$

The discrete time autocorrelation $r_t[n]$ may use the channel estimates at sub-channel index k in OFDM symbols m and m+Δm for varying sizes of Δm.

For a common flat fading statistical channel model, with a fixed transmitter and a mobile receiver at velocity v, the discrete time autocorrelation $r_t[n]$ may be given as $$r_t[n] = J_0(n2\pi f_d T_s) \quad (5)$$

and the Doppler frequency $f_d = (v/c)f_c$ may relate to a relative velocity v and a carrier frequency $f_c$. The variable c equals the speed of light. As v<<c we can see that $f_d<<f_c$, thus the Doppler frequency spread $2f_d$ may be small compared with the carrier frequency. The function $J_0(x)$ is the zero-order Bessel function of the first kind which is defined as $$J_0(x) \equiv \frac{1}{\pi} \int_0^\pi e^{jx\cos\theta} d\theta \quad (6)$$

Figure 3:
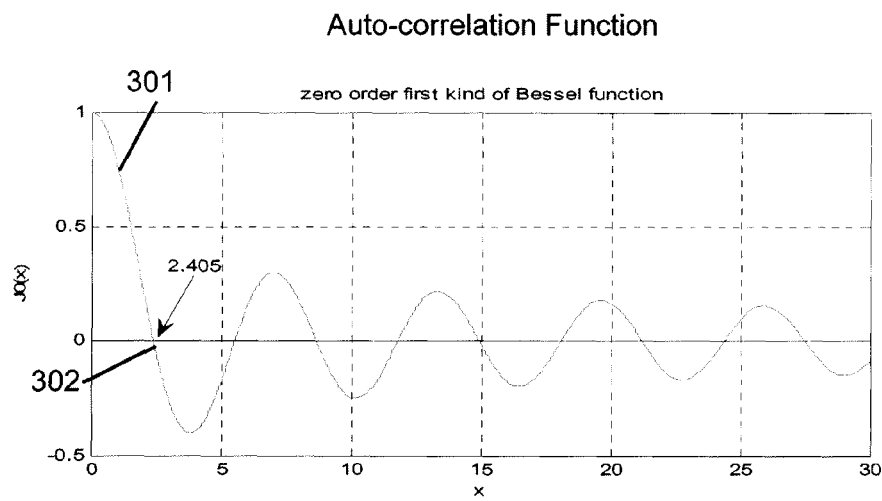
FIG. 3 illustrates a time autocorrelation function for a statistical model of a communications channel with a fixed transmitter and a mobile receiver.

FIG. 3 illustrates a plot of the zero-order Bessel function $J_0(x)$ of Equation (6).

A method to estimate the Doppler frequency $f_d$ may look for the first zero crossing of the discrete time autocorrelation function $r_t[n]$ of Equation (5) when $J_0(2.405)=0$. Knowing the difference in OFDM symbols $\Delta m_0$ that may result in a first zero crossing of the discrete time autocorrelation function $r_t[n]$, one may estimate the Doppler frequency $f_d$ as $$f_d = \frac{2.405}{2\pi \Delta m_0 T_s} \quad (7)$$

For a slowly moving mobile receiver, e.g. a pedestrian, the Doppler frequency may be quite small and therefore may require many successive OFDM symbols across which to calculate the autocorrelation function to determine a first zero crossing. For example, with a carrier frequency $f_c=1$ GHz and a mobile velocity v=3 ml/h, the Doppler frequency $f_d=4.5$ Hz. For an OFDM symbol period of $T_s=1$ms, the difference in OFDM symbols $\Delta m_0=86$ may be quite large. As shown in FIG. 1, a Doppler frequency estimate may be required to generate a set of Wiener filter coefficients for the Wiener interpolation block 103 that then may calculate channel estimates at all sub-channels. These channel estimates may be used to adjust the received pilot symbols and data symbols prior to further receive processing. A long delay in determining a Doppler frequency may require significant storage and cost to process the received data, which may prove infeasible in certain applications. Thus, a different method may be needed to estimate the Doppler frequency $f_d$.

Figure 4:
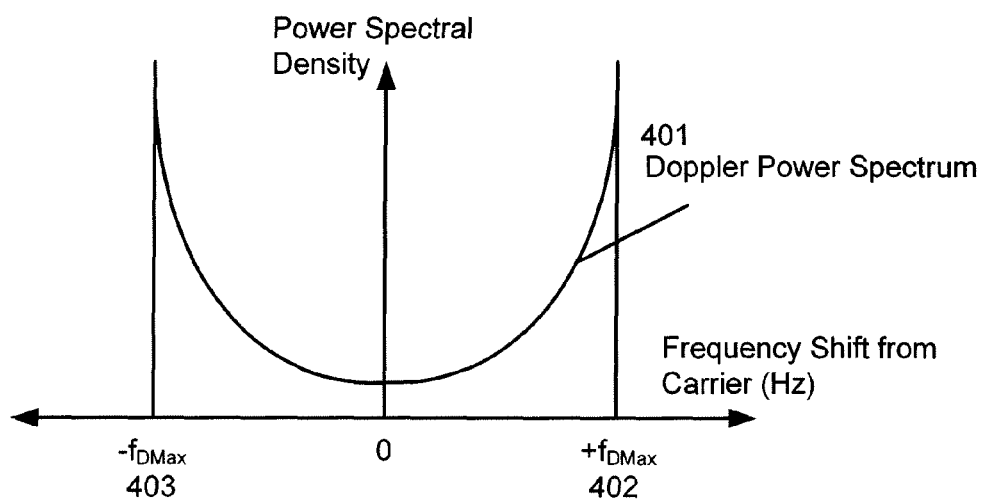
FIG. 4 illustrates a power spectral density function for the mobile receiver statistical model of FIG. 3.

Knowledge of the Doppler frequency $f_d$ may be used when calculating a set of Wiener filter coefficients for a Wiener interpolation filter. FIG. 4 illustrates a Doppler power spectrum 401 for a communications channel with a time autocorrelation given by FIG. 3. The movement of the mobile receiver relative to the transmitting station causes a shift in the power from the center carrier frequency (indicated as 0 in FIG. 4) toward the Doppler frequencies, a higher shift toward $+f_{Dmax}$ 402 when moving toward the transmitting station and a lower shift toward $-f_{Dmax}$ 403 when moving away from the transmitting station. A Wiener interpolation filter may provide optimal mean-square error channel estimates if the Wiener interpolation filter bandwidth is matched to the Doppler power spectrum 401.

Figure 5:
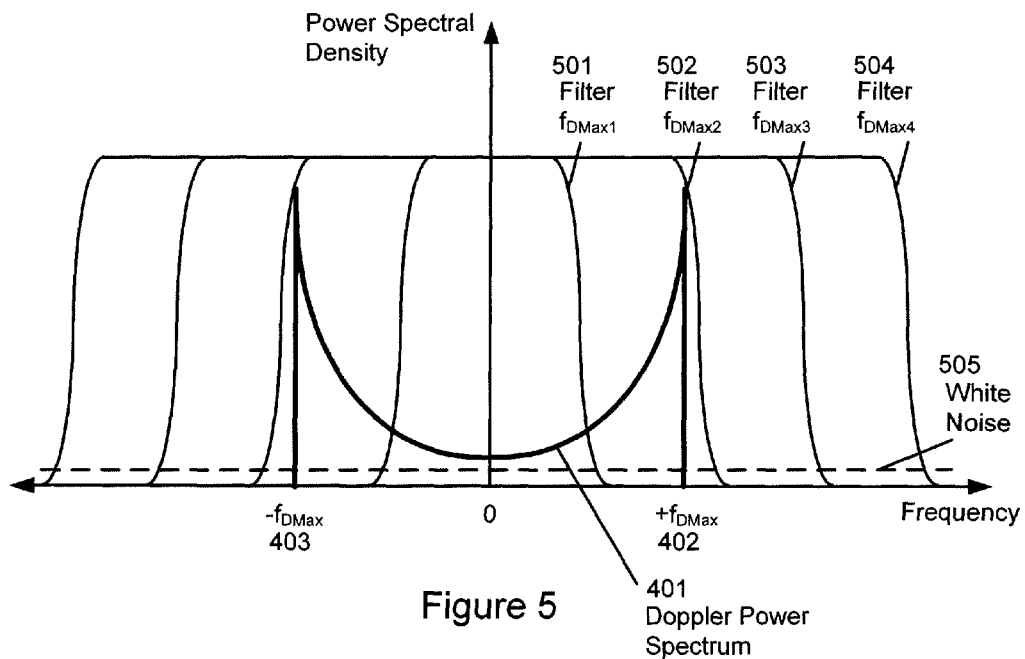
FIG. 5 illustrates the power spectral density function of FIG. 4 approximated by several root raised cosine filters.

FIG. 5 illustrates the Doppler power spectrum 401 overlaid by several Wiener interpolation filters of varying bandwidths. The Wiener interpolation filter 501 with a one-sided bandwidth of $f_{Dmax1}$ may be too narrow and may cut out information in the transmitted spectrum, while the Wiener interpolation filters 503 and 504 with one-sided bandwidths of $f_{Dmax3}$ and $f_{Dmax4}$ may include more background white noise 505 in the interpolation which may result in lower performance. The Wiener interpolation filter 502 with a one-sided bandwidth of $f_{Dmax2}$ may best match the Doppler power spectrum 401 maximizing information used in the interpolation, while also minimizing the amount of added white noise.

Figure 16:
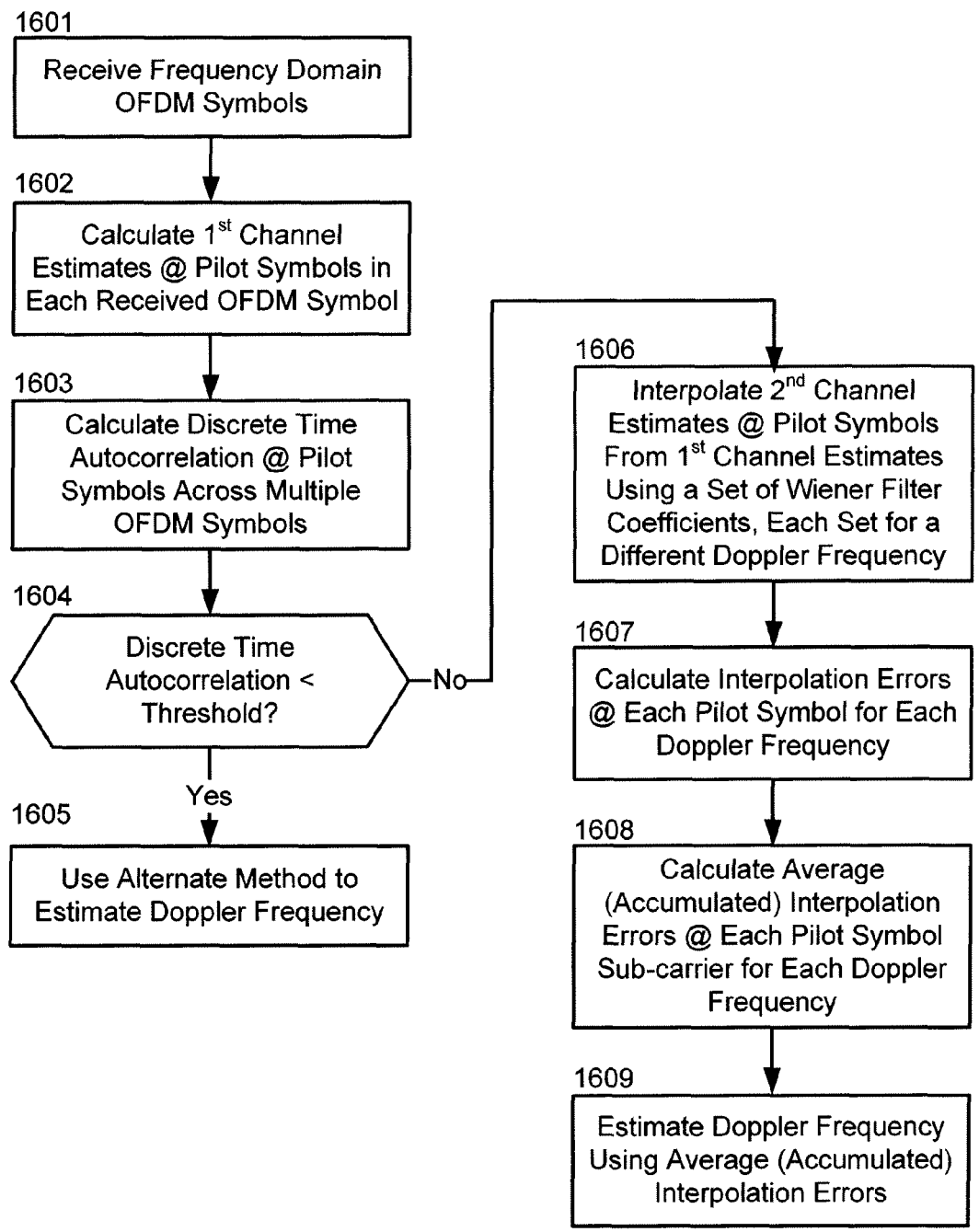
FIG. 16 illustrates a method for estimating the Doppler frequency using pilot symbols in an OFDM system.

Rather than estimate the Doppler frequency prior to Wiener filter interpolation, one may try several Wiener interpolation filters with different bandwidths to determine which has the best performance and thereby estimate a Doppler frequency. This method may prove faster than calculating a discrete time autocorrelation function as in Equation (4) over many successive OFDM symbols, for the appropriate time differential $\Delta m$ may be large when the mobile velocity is relatively low. FIG. 16 illustrates one method for the Doppler frequency estimation in block 105 of FIG. 1A that may proceed as follows. In step 1601, receive a set of OFDM symbols output from the FFT block 101, and in step 1602 calculate a set of first channel estimates by dividing the received values at each pilot sub-carrier frequency in the set of OFDM symbols by an appropriate known transmit symbol (also indicated as block 102 in FIG. 1). Next in step 1603 calculate a discrete time autocorrelation function of Equation (4) using the set of first channel estimates from successive pilot symbols at a particular sub-carrier frequency. For example, the pilot symbols 205 and 204 in FIG. 2 may be used to calculate a value for the discrete time autocorrelation function of Equation (4) with a time separation $\Delta m=4$. The discrete time autocorrelation of step 1603 may be calculated at one sub-carrier frequency only (i.e. using pilot symbols in a single column of FIG. 2) or may be calculated at several different sub-carrier frequencies in parallel. In Step 1604, test if the calculated value of the discrete time autocorrelation function of Equation (4) is less than a predetermined threshold, for example 0.5, over two successive pilot symbols at a particular sub-carrier frequency. If the values of the discrete time autocorrelation function of Equation (4) fall below the predetermined threshold in the time period between two successive pilot symbols at a particular sub-channel frequency, then the mobile velocity may be high. In this high velocity case, where the discrete time autocorrelation function rapidly reaches zero, an alternative method may be used to estimate the Doppler frequency as indicated in step 1605.

If the calculated discrete time autocorrelation function of Equation (4) is higher than the threshold over two or more successive pilot symbols, then the mobile velocity may be low. In this low velocity case, collect the first channel estimates for M successive pilot symbols $\{H_m|m=1,2,\ldots M\}$ at a given sub-channel frequency. (Note that the pilot symbols in a particular sub-channel may be spaced more than one OFDM symbol apart, for example one pilot symbol every four OFDM symbols as shown in FIG. 2.) In step 1606, using a set of Wiener filter coefficients $\{C_{m,fDmaxi}|m\neq n\}$, each set calculated for a different maximum Doppler frequency $f_{Dmaxi}$, estimate a second channel estimate $\hat{H}_{n,fDmaxi}$ for each pilot symbol (the first estimate being $H_n$) by interpolation using the set of first channels estimates $\{H_m|m\neq n\}$ from the other pilot symbols at the same frequency sub-channel as indicated in Equation (8).

$$\hat{H}_{n,fDmaxi} = \sum_{m=1:M|m\neq n} H_m C_{m,fDmaxi} \qquad (8)$$

For example, referring to FIG. 2, one may interpolate a second channel estimate for pilot symbol 204 (in step 1606) using the first channel estimates determined for pilot symbols 201, 203 and 205 (in step 1602). The pilot symbols used for interpolation need not be symmetrically placed in time about the pilot symbol being estimated. Next in step 1607, calculate an interpolation error $E_{n,fDmaxi}$ for each Doppler frequency estimate $f_{Dmaxi}$ for each pilot symbol at a sub-carrier frequency n, $$E_{n,fDmaxi} = \hat{H}_{n,fDmaxi} - H_n \qquad (9)$$

and average (or accumulate) these interpolation errors in step 1608 resulting in an average interpolation error $E_{ave,fDmaxi}$ or an accumulated interpolation error $E_{accum,fDmaxi}$ for each Doppler frequency estimate $f_{Dmaxi}$.

$$E_{ave,fDmaxi} = \frac{1}{M}\sum_{n=1}^{M} E_{n,fDmaxi} \qquad (10)$$

$$E_{accum,fDmaxi} = \sum_{n=1}^{M} E_{n,fDmaxi}$$

Finally in step 1609 choose as the Doppler frequency estimate the Doppler frequency for the Wiener interpolation filter with the minimum average (or accumulated) interpolation error.

FIG. 16 illustrates one method to estimate the Doppler frequency from channel estimates of pilot symbols at one sub-carrier frequency. Alternatively, one may perform the same calculation at multiple sub-carrier frequencies in parallel. Referring to FIG. 2, one may calculate channel estimates for the sub-channel frequencies containing pilot symbols 206, 208 and 209 in parallel using channel estimates from other pilot symbols (i.e. solid dots) in their same columns respectively. One may then calculate a set of interpolation errors for each of the pilot symbols at a particular sub-carrier frequency (i.e. in same column), one interpolation error for each Doppler frequency. These interpolation errors may be averaged (or accumulated) across multiple OFDM symbols (i.e. over time) as in Equation (10). Then, the interpolation errors may be averaged (or accumulated) across different sub-channel frequencies for the same Doppler frequency to generate an overall interpolation error for that Doppler frequency. The Doppler frequency may then be estimated from these interpolation errors that were calculated across multiple OFDM symbols and multiple sub-carrier frequencies.

The Doppler frequency estimate determined in block 105, and described above, may be used to determine Wiener filter coefficients for a Wiener filter interpolation block 103 to provide channel estimates at both data symbols and pilot symbols, using the channel estimates calculated at the pilot symbols in block 102. To avoid aliasing in the Wiener filter interpolation of block 103, the pilot symbols should be spaced sufficiently closely to satisfy the Nyquist sampling theorem. With one pilot symbol every $D_t$ OFDM symbols, the sampling rate in the time direction is $1/(D_t T_s)$, where $T_s$ is the OFDM symbol period. The channel variation in the time direction for a wireless system may depend on the maximum Doppler frequency $f_{Dmax}$. It may suffice to avoid aliasing if the sampling rate exceeds the bandwidth of the channel variation, i.e. $1/(D_t T_s) > 2 f_{Dmax}$.

Figure 6:
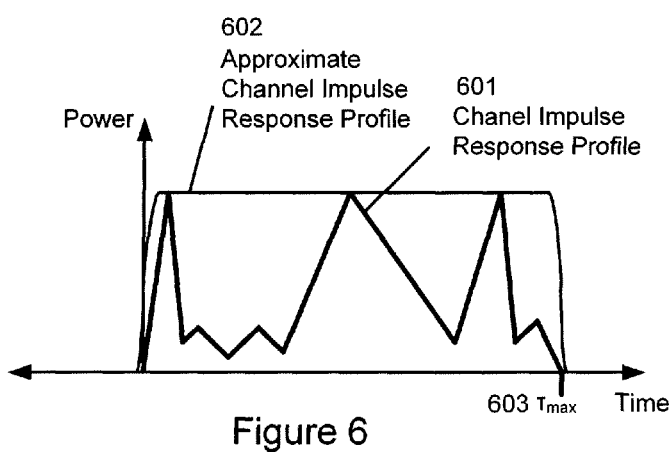
FIG. 6 illustrates a time domain impulse response for a receiver with multipath.

The Wiener filter coefficients used in the Wiener interpolation filter 103 may also depend on an estimate of the communication channel's time-domain impulse response, i.e. the Wiener filter coefficients may be for a two-dimensional Wiener interpolation filter that operates across both time and frequency. FIG. 6 illustrates a typical time-domain channel impulse response profile 601 showing three peaks at different delays representing multi-path interference. The channel impulse response profile 601 may vary over time, thus the peaks in the impulse response may shift to different times within a maximum delay window, i.e. from time 0 to time $\tau_{max}$ 603. As one may not know the exact time-varying channel impulse response profile, an approximate channel impulse response profile 602 may be pre-calculated that estimates the maximum delay $\tau_{max}$ 603 that may occur. FIG. 6 illustrates one such approximate channel impulse response profile 602 using a root-raised cosine shape that covers the maximum time delay window.

Figure 7:
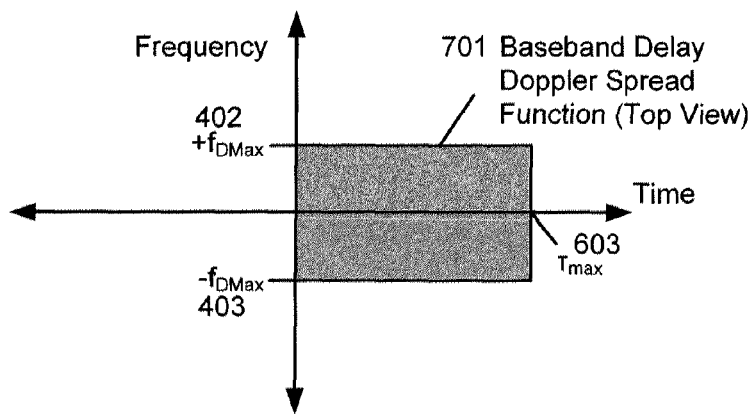
FIG. 7 illustrates a baseband region of non-zero amplitude for a delay Doppler spread function of a mobile receiver with multipath.

Combining the time-domain approximate channel impulse response profile 602 of FIG. 6 with a frequency domain estimated Doppler frequency of $f_{Dmax}$ may result in a two-dimensional baseband delay Doppler spread function 701 as shown in FIG. 7. FIG. 7 illustrates a "top view" of the baseband delay Doppler spread function 701 with a region of time delay r extending from 0 to $\tau_{max}$ 603 and Doppler frequency $f_D$ extending from $-f_{Dmax}$ 403 to $+f_{Dmax}$ 402 over which the baseband delay Doppler spread function 701 may be significantly non-zero. The baseband delay Doppler spread function 701 $S(\tau, f_D)$ may be calculated as the two-dimensional Fourier transform of a continuous (infinitely finely sampled) time-varying channel frequency response H(f,t).

Figure 8:
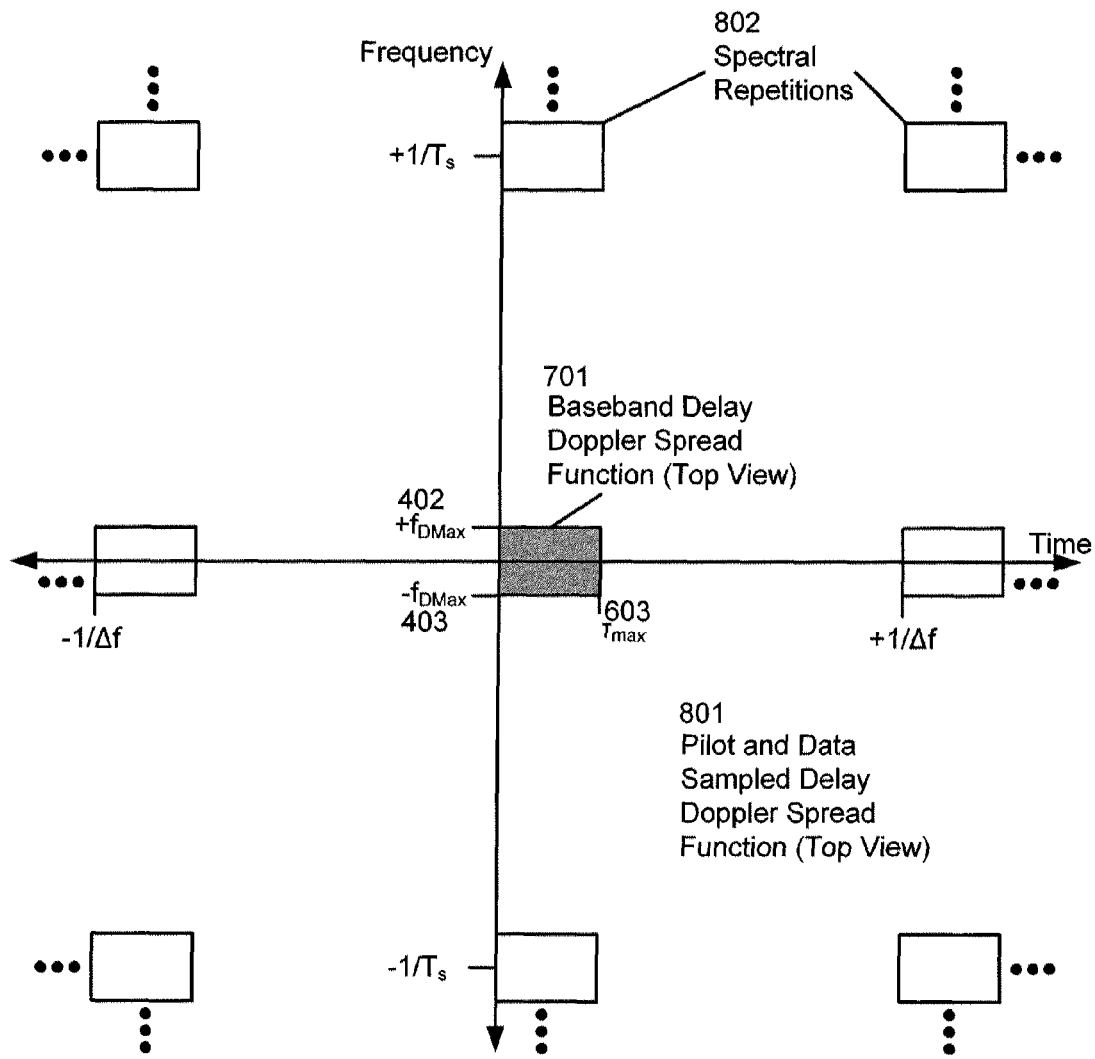
FIG. 8 illustrates the delay Doppler spread function of FIG. 7 sampled regularly in time and frequency.

Sampling the continuous time channel frequency response H(f,t) to match a discrete time communication system with an OFDM symbol duration $T_s$ and a sub-channel frequency spacing of $\Delta f$ may result in spectral repetitions 802 of the baseband delay Doppler spread function 701 as illustrated in FIG. 8. Note that FIG. 8 illustrates the spectral repetitions 802 that may result at a sampling rate that includes both pilot and data samples. Recall that multiplying by an impulse train in one domain (i.e. sampling) is equivalent to convolution by an impulse train (i.e. replication) in a transform domain. Thus sampling in the time domain at rate $T_s$ may produce replicas spaced $1/T_s$ apart in the frequency direction, and sampling in the frequency domain at a rate of $\Delta f$ may result in replicas spaced $1/\Delta f$ in the time (delay) direction.

The pattern of repeated spectra shown in FIG. 8 may hold for a fully sampled channel frequency response H(f,t) with a value at every sub-channel in every OFDM symbol (i.e. including both pilot and data samples). With samples spaced only at the pilot sub-channels, the spacing of the spectral repetitions may change. More widely spaced samples of H(f, t) may result in more closely spaced spectral repetitions. If the pilot sub-channels are spaced too far apart the spectral repetitions may overlap, thereby causing aliasing.

Figure 9:
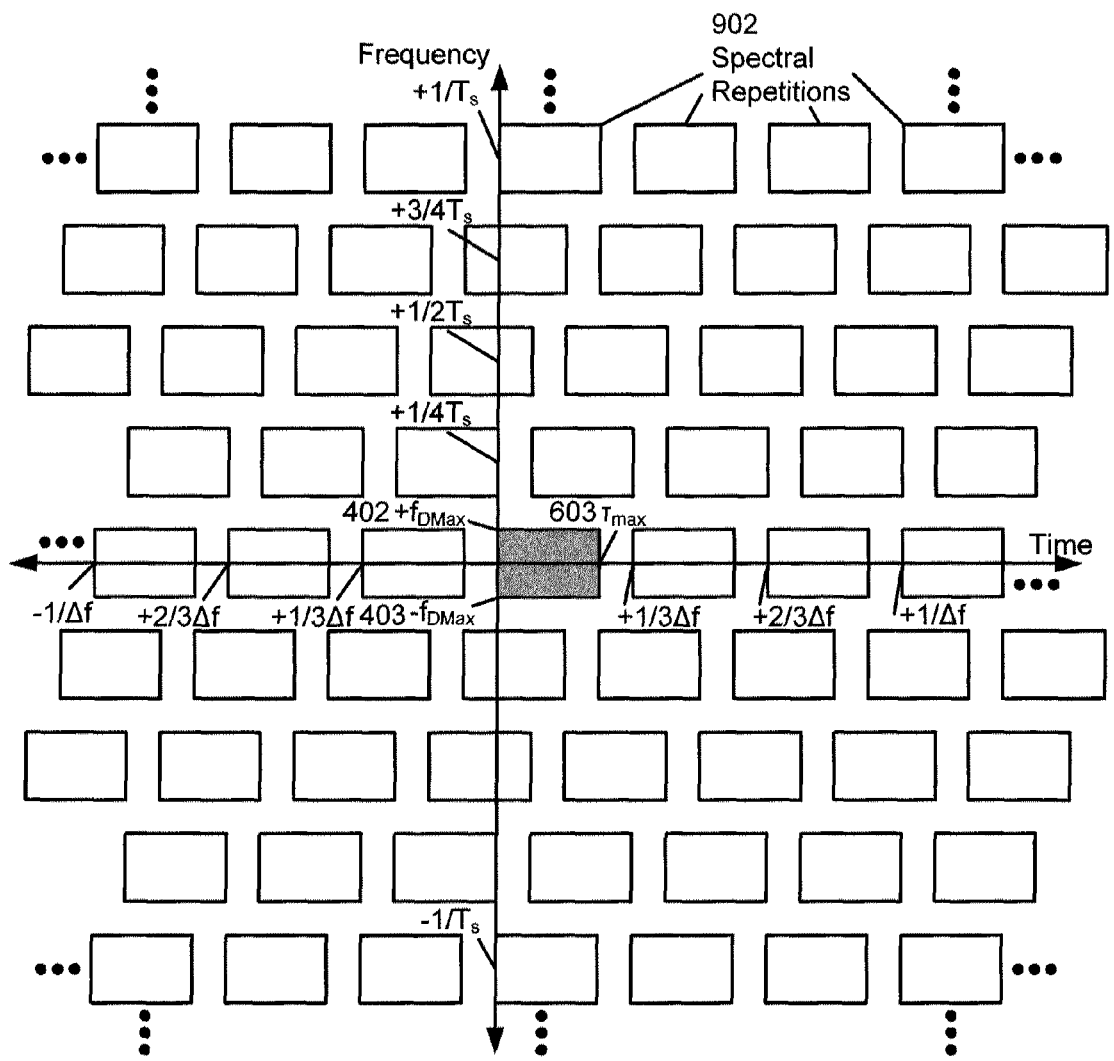
FIG. 9 illustrates the delay Doppler spread function of FIG. 7 sampled at a lower rate in time and frequency than FIG. 8.

FIG. 9 illustrates the pilot only delay Doppler spread function 901 including spectral repetitions 902 based on a pilot pattern used in a digital television broadcasting terrestrial (DVB-T) or handheld (DVB-H) system. This pattern may correspond to the pilot sub-channel sampling pattern (solid dots=samples) illustrated in FIG. 2. Note that the spectral repetitions in FIG. 9 may be more closely packed that those in FIG. 8. With a relatively wide maximum delay $\tau_{max}$ 603 as shown in FIG. 9, no aliasing (overlap) may occur if the maximum Doppler frequency $f_{Dmax}<1/(8T_s)$ and if the maximum delay $\tau_{max}<1/(3\Delta f)$.

Figure 10:
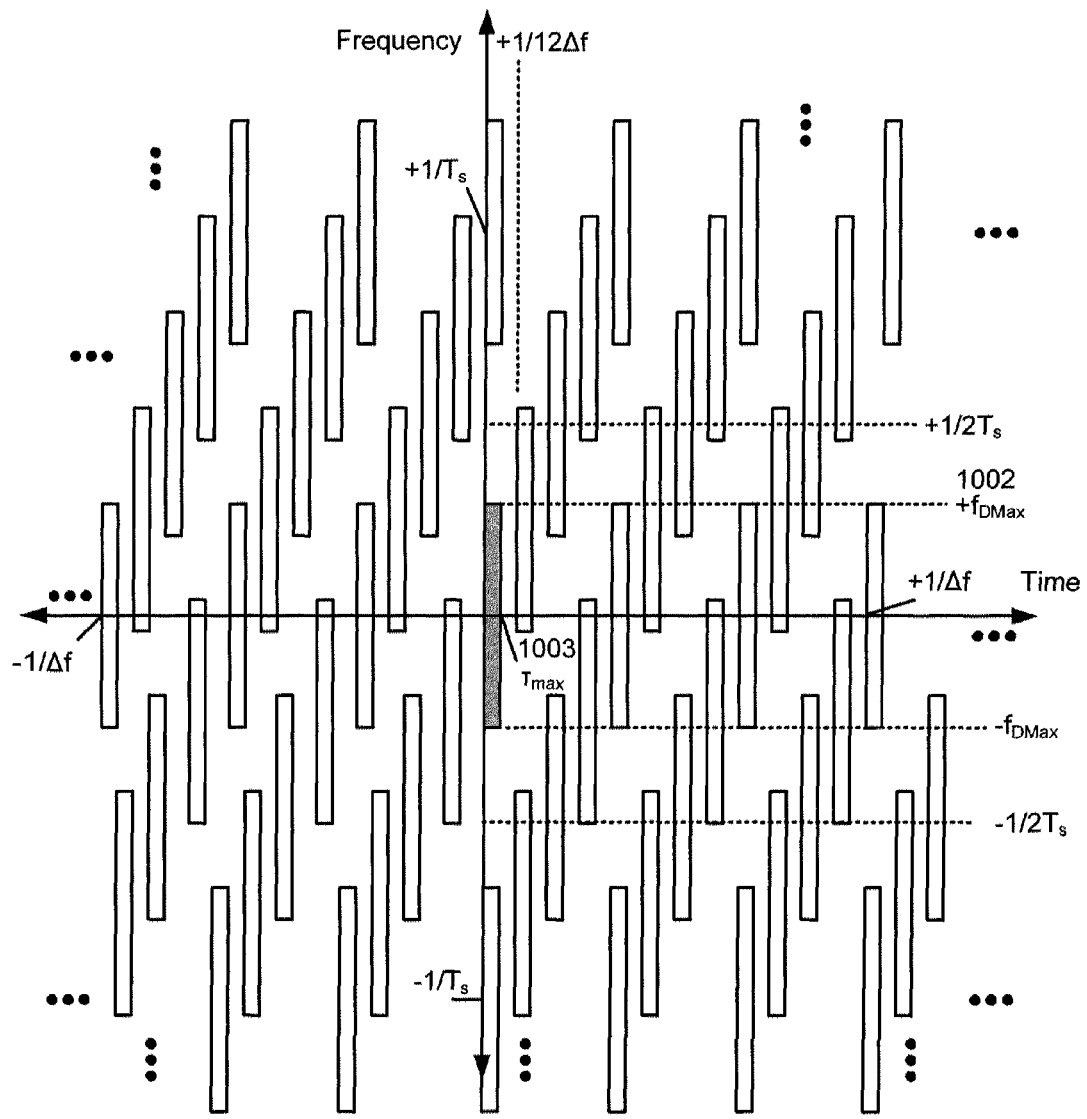
FIG. 10 illustrates a sampled delay Doppler spread function with a narrower time delay and higher Doppler spread than FIG. 9.

To achieve successful mobile television reception (DVB-T/H, ISDB-T) one may need to estimate the channel by Wiener filter interpolation when the channel impulse response rapidly varies in time, i.e. when the Doppler frequency $f_{Dmax}>1/(8T_s)$ exceeds the no aliasing condition derived above. One solution may restrict the mobile receiver to operate only when the maximum delay $\tau_{max}$ is much smaller resulting in narrow delay Doppler spread functions as illustrated in FIG. 10. For a relatively narrow delay $\tau_{max}$ 1003, no aliasing may occur if the maximum Doppler frequency $f_{Dmax}<1/(2T_s)$ and if the maximum delay $\tau_{max}<1/(12\Delta f)$. Thus, a 4× reduction in the maximum delay $\tau_{max}$ (comparing the wide delay $\tau_{max}$ 603 of FIG. 9 to the narrow delay $\tau_{max}$ 1003 of FIG. 10) may provide a 4× improvement in the maximum Doppler frequency supported, i.e. from a maximum of $1/(8T_s)$ to a maximum of $1/(2T_s)$.

For the narrow delay case illustrated in FIG. 10, no time interpolation may be required as there may be no spectral repetitions to alias in the frequency direction. Interpolation in frequency, i.e. along the time direction, may be used. Thus, one may fill in the discrete time channel transfer characteristic H[m,k] for each OFDM symbol with index m, using only pilots in that OFDM symbol. Disadvantages to this approach include: (1) pilot symbols may be spaced quite sparsely, e.g. one per 12 sub-channels, thus incurring larger interpolation noise, and (2) a channel model using narrow delay may not apply to a single frequency network (SFN) communication system that includes large delays (i.e. larger than the narrow delay shown in FIG. 10) because the mobile may receive the same signal at different times from more than one transmitting station.

Figure 11:
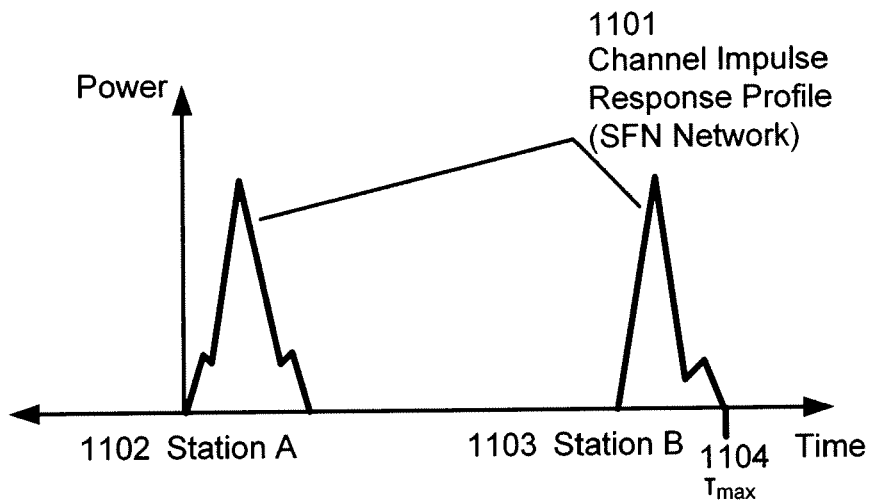
FIG. 11 illustrates an example channel impulse response received by a mobile receiver in a single frequency network (SFN) with two dominant transmit stations.
Figure 12:
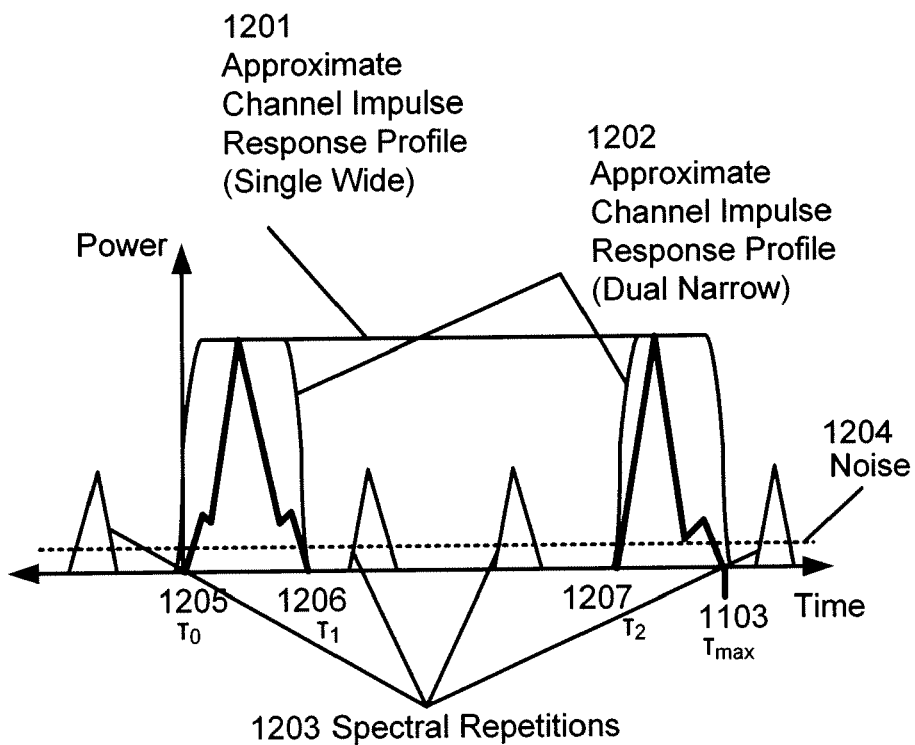
FIG. 12 illustrates two approximations to the channel impulse response of FIG. 11, one wide band and one using two narrow bands.

One aspect of the invention develops a Wiener interpolation filter that may use signals from more than one SFN station while eliminating the potentially aliasing images in a high Doppler environment. Prior art methods may use a Wiener interpolation filter that spans the large delay spread between the different SFN stations and may include aliased images for a mobile receiver in a high velocity (high Doppler frequency) environment. FIG. 11 illustrates a channel impulse response profile 1101 for an SFN network with a mobile receiver receiving a first signal from a station A 1102 and a second signal from a station B 1103, where the received signals may be distinctly separated in time. A prior art channel estimator may approximate the channel impulse response profile 1101 that encompasses the signals from both station A and station B using a single wide approximate channel impulse response profile 1201 as shown in FIG. 12. As described above for systems with a relatively wide delay, spectral repetitions 1203 may result in aliasing when using the single wide approximate channel impulse response profile 1201 that extends from $T_0$ 1205 to $\tau_{max}$ 1103 for the Wiener interpolation filtering. Additionally, such a Wiener interpolation filter may include more background noise than desired. Alternatively, one may use a Wiener interpolation filter based on a pair of narrow channel impulse response profiles 1202 that only extend from $\tau_0$ 1205 to $\tau_1$ 1206 and from $\tau_2$ 1207 to $\tau_{max}$ 1103 as shown in FIG. 12. Such a filter may both avoid aliasing (by not including the spectral repetitions 1203) and minimize the background noise 1204 included as well.

Figure 13:
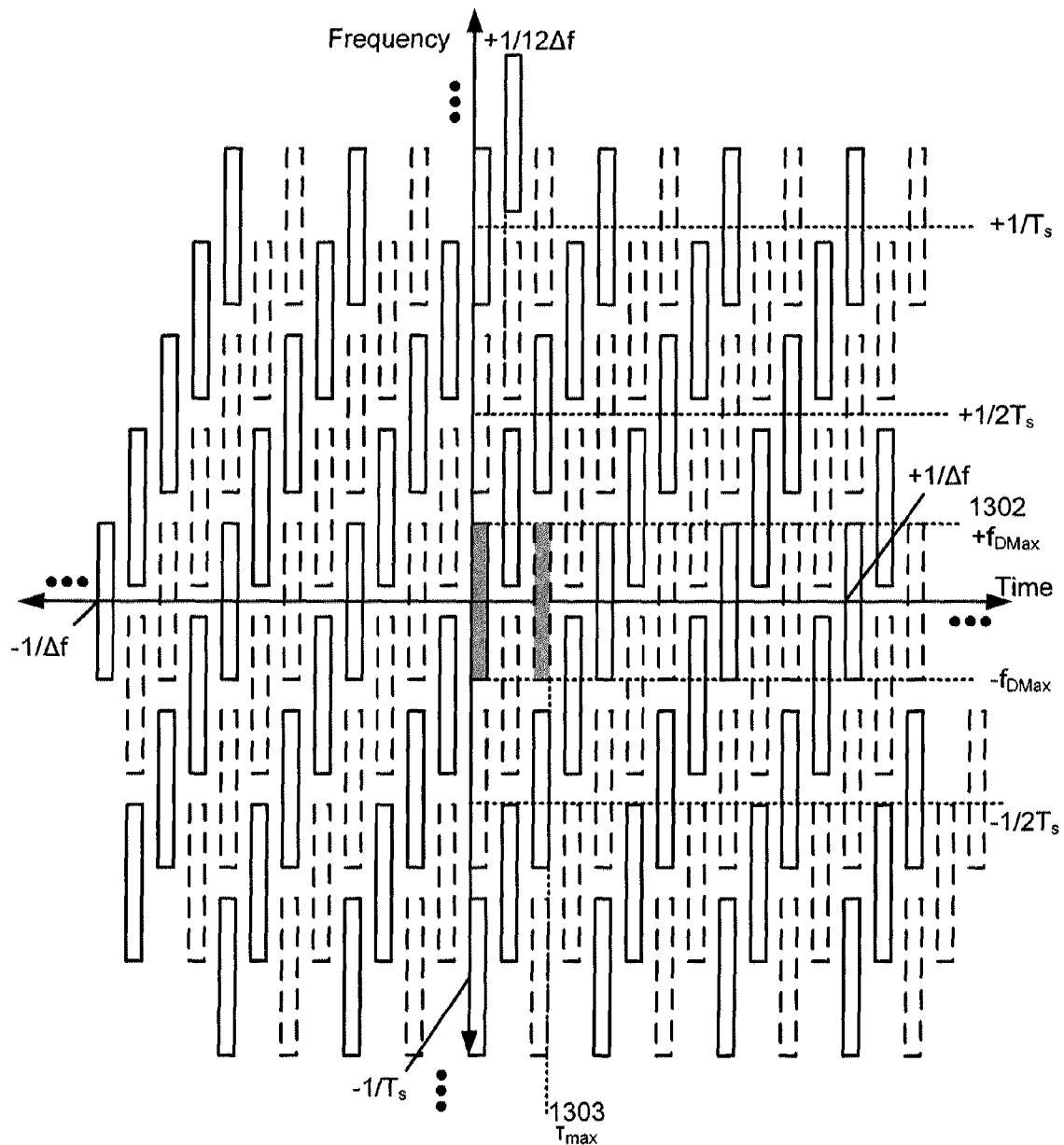
FIG. 13 illustrates a sampled delay Doppler spread function for a mobile receiver in a high Doppler environment with two dominant transmit stations.

FIG. 13 illustrates a pilot only sampled delay Doppler spread function for a dual station SFN as described for FIG. 11 where the baseband delay Doppler spread function is shown as the pair of shaded boxes in the center. Station A corresponds to the solid outline boxes while Station B corresponds to the dashed outline boxes. The width of each of the boxes may increase to $1/(12 \Delta f)$, which may correspond with the maximum delay for each single station's channel impulse response profile, without incurring an aliasing overlap. Similarly, the maximum Doppler frequency (height of the boxes) may increase to $1/(4T_s)$ without incurring an aliasing overlap. This frequency is more than the $1/(8T_s)$ limit described earlier for the wide delay system of FIG. 9 but less than the $1/(2T_s)$ limit described for the single station narrow delay system of FIG. 10.

Figure 14:
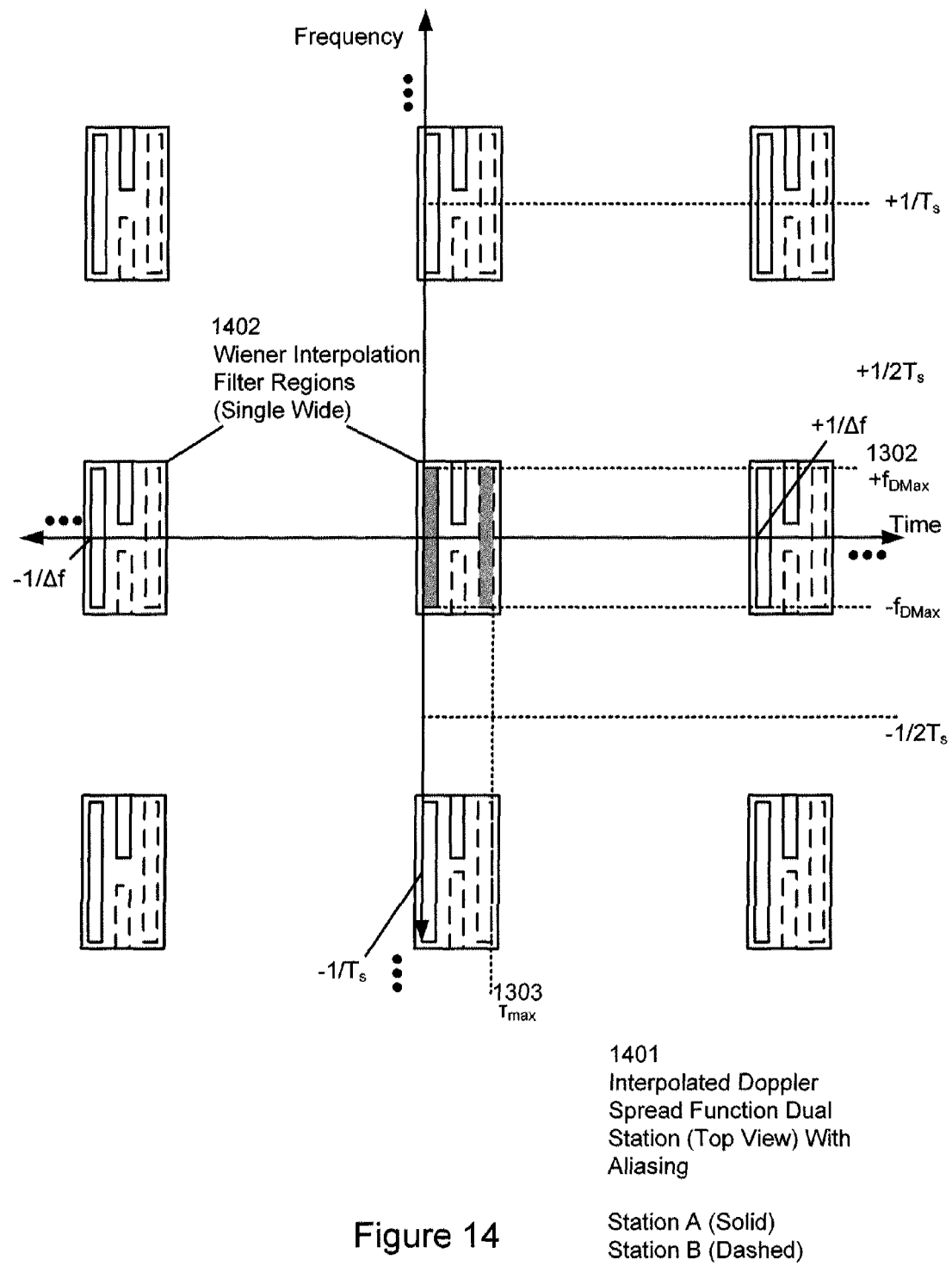
FIG. 14 illustrates a sampled delay Doppler spread function after interpolation by a single wide band Wiener filter.
Figure 15:
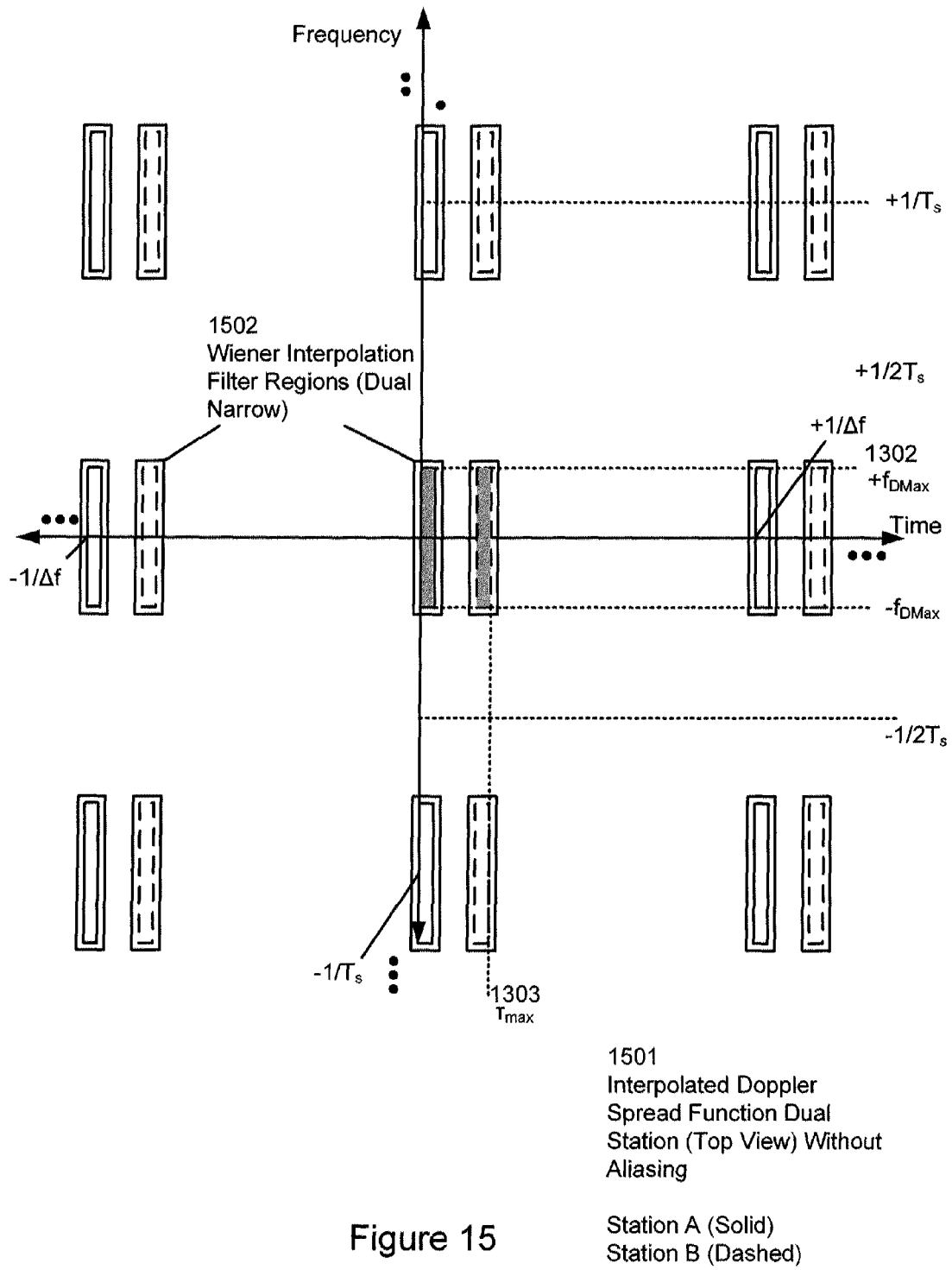
FIG. 15 illustrates a sampled delay Doppler spread function after interpolation by a pair of narrow band Wiener filters.

A single wide Wiener interpolation filter that spans the channel impulse responses for both station A and station B may result in aliasing as indicated by the interpolated Doppler spread function 1401 in FIG. 14. Within each of the Wiener interpolation filter regions 1402 spectral repetitions may be included that may result in aliasing, thereby lower the performance. In contrast, a dual narrow Wiener interpolation filter that covers individually the channel impulse responses for both Station A and station B and does not include a region between the stations may result in no aliasing as indicated by the interpolated Doppler spread function 1501 in FIG. 15. No spectral repetitions may be included in the narrower Wiener interpolation filter regions 1502, thereby eliminating aliasing as well as minimizing the added background noise.

In general, within single frequency networks, the maximum delay spread for a single transmitting station may be approximately 1 µs in rural areas, 10 µs in urban areas, and 20 µs in hilly terrain. Each of these maximum delay spreads for a single station may be much smaller than the delay incurred between stations. For example, a signal from a station A may be separated in time by tens of micro-seconds from a signal from a station B with little energy received in between. Knowing that this separation may occur, one may approximate the overall channel impulse response more accurately using a plurality of narrow filters rather than a single wide filter. Each narrow filter may approximate the channel impulse response for a single transmit station. Even in a high Doppler frequency spread environment, a Wiener interpolation filter based on such a plurality of channel impulse responses may filter the signals without aliasing in the spectral repetitions that a Wiener interpolation filter based on a single wide impulse response would include.

As the actual channel impulse response may be time-varying, a pre-calculated estimate of the channel impulse responses may be used. A number of candidate channel impulse responses may be pre-calculated by a channel approximation block 106 to input to the Wiener filter coefficient generation block 107. Several different delay spreads may be approximated for each of a plurality of stations, and combinations of multiple stations, each with its own delay spread, may be stored. The channel approximation block 106 may select one of the pre-calculated channel impulse responses based on a measurement of the channel. For example, for the channel impulse response shown in FIG. 12, one may approximate the channel impulse response as a pre-calculated, stored combination of a $\tau_1-\tau_0$ wide pulse and a $\tau_{max}-\tau_2$ wide pulse. The Wiener filter coefficient generation block 107 may then calculate a set of Wiener filter coefficients based on the approximated channel impulse response.

Alternatively one may pre-calculate and store a set of channel impulse responses, each for a different delay spread, and then one may approximate the channel as a linear combination of the pre-calculated, stored channel impulse responses based on a measurement of the channel. For the channel impulse response shown in FIG. 12, for example, a $\tau_1-\tau_0$ wide pulse and a $\tau_{max}-\tau_2$ wide pulse may each be stored individually and then linearly combined with an appropriate separation between them to form a channel impulse response based on measuring the channel. The Wiener filter coefficient generation block 107 may then calculate a set of Wiener filter coefficients based on the approximated channel impulse response.

In another implementation, the pre-calculated channel impulse responses may be used to pre-calculate multiple sets of Wiener filter coefficients, each set for a different channel impulse response and different Doppler frequency. As described above, the channel impulse responses may consist of a plurality of different width pulses. An appropriate set of Wiener filter coefficients may then be chosen based on measurements at the mobile receiver that estimate the channel impulse response and the Doppler frequency. Alternately, one may pre-calculate a set of Wiener filter coefficients for a single filter of different maximum time delays and at different Doppler frequency bandwidths. A set of Wiener filter coefficients for the Wiener interpolation block 103 may then be determined by linearly combining a plurality of sets of Wiener filter coefficients based on a superposition of estimated channel impulse responses, one from each transmit station seen at the mobile receiver. For example, considering the channel impulse response shown in FIG. 12, one may pre-generate a set of Wiener filter coefficients for a $\tau_1-\tau_0$ wide pulse and a separate set of coefficients for a $\tau_{max}-\tau_2$ wide pulse and then linearly combine these coefficients (taking into account the time delay between the pulses) to form a set of Wiener filter coefficients to be used by the Wiener interpolation block 103.

Some additional details of mathematical models for the Wiener filter interpolation are described next. Let an $N_{tap}$ by 1 vector of received pilot symbol values, after division by the associated known transmit signal values on each sub-channel, be denoted as $\vec{y}=\vec{h}+\vec{n}$. (Each element of $\vec{y}$ represents a "noisy" first channel estimate based on a pilot symbol in a particular OFDM symbol at a particular sub-channel frequency. The vector $\vec{h}$ represents the actual channel values to be estimated, and the vector $\vec{n}$ represents the additive noise.) A 1 by $N_{tap}$ vector of Wiener filter coefficients $\vec{w}[k,l]$ to estimate a time-varying channel frequency response $h[k,l]$, i.e. an element of the vector $\vec{h}$ at time index k (e.g. the OFDM symbol number) and frequency index l (i.e. the sub-channel frequency position), may be given as $\hat{h}[k,l]=\vec{w}^T[k,l]\vec{y}$. The optimal Wiener filter coefficients $\vec{w}[k,l]$ may be derived from the two-dimensional discrete-time Wiener-Hopf equations resulting in $\vec{w}[k,l]=R_{yy}^{-1}R_{hy}$, where $R_{yy}=E\{\vec{y}\vec{y}^H\}$ is an autocorrelation matrix and $R_{hy}=E\{h[k,l]\vec{y}^*\}$ is a cross correlation vector, and the superscript $H$ indicates the complex conjugate transpose and the superscript * indicates the complex conjugate. The matrix $R_{yy}$ and the vector $R_{hy}$ may be determined by the statistics of the time-varying channel frequency response.

The time-varying channel response of a wide sense stationary channel may be modeled by a uniform Doppler power spectrum, where $f_{Dmax}$ may be the one-sided maximum Doppler frequency, and a uniform delay power spectrum, where $T_{max}$ may be the one-sided maximum echo delay. Assume that the received signal $\vec{y}$ may be observed in additive white Gaussian noise $\vec{n}$ with an average signal-to-noise ratio (SNR) of $E_s/N_0$, where $E_s$ may represent the average energy per symbol and $N_0$ may represent the one-sided noise spectral density. In this case, the $N_{tap}$ by 1 cross correlation vector $R_{hy}$ may be given as $$R_{hy}(k-k'',l-l'')=r_t(k-k'')r_f(l-l'') \qquad (11)$$

with a time autocorrelation $$r_t(k-k'')=J_0((2\pi f_{Dmax}T_s(k-k''))) \qquad (12)$$

and a frequency autocorrelation $$r_f(l-l'')=si((2\pi T_{max}\Delta f(l-l''))). \qquad (13)$$

The $N_{tap}$ by $N_{tap}$ autocorrelation matrix $R_{yy}$ may be then given as $$R_{yy}(k'-k'', l'-l'') = \frac{N_0}{E_s}\delta(k'-k'', l'-l'') + r_t(k-k'')r_f(l-l'') \quad (14)$$

where $\{k,l\}$ may be the discrete time and frequency location that we want to estimate and $\{k'',l''\}$ may be the discrete time and frequency location of the received signal $\vec{y}$.

To provide a more precise estimation of the frequency autocorrelation $r_f$ than a uniform delay power spectrum, one may define a frequency autocorrelation matrix $R_f$ as $$R_f = \begin{bmatrix} r_f[0] & \cdots & r_f[L-1] \\ \vdots & \ddots & \vdots \\ r_f[-L+1] & \cdots & r_f[0] \end{bmatrix} \quad (15)$$

$$= W^H \cdot \overline{D} \cdot W$$

where W may be an L by L discrete Fourier transform (DFT) matrix defined as $$W \equiv \begin{bmatrix} 1 & 1 & \cdots & 1 \\ 1 & e^{j(2\pi/L)} & \cdots & e^{j(2\pi(L-1)/L)} \\ \vdots & \cdots & \cdots & \vdots \\ 1 & e^{j(2\pi(L-1)/L)} & \cdots & e^{j(2\pi(L-1)(L-1)/L)} \end{bmatrix} \quad (16)$$

and $\overline{D}$ may be a diagonal matrix approximating a channel impulse response with L diagonal elements covering a total time period of $T_u$, which may correspond to the usable time interval of an OFDM symbol.

For a single wide approximate channel response profile 1201 as shown in FIG. 12, the diagonal matrix $\overline{D}$ may be given as $$\overline{D} = \frac{L}{L_2} \times \text{diag}\{\underbrace{1, \ldots, 1}_{L_2 \text{ elements}(T_{max})}, 0, \ldots, 0\} \quad (17)$$

where $$L_2 = \left\lceil \frac{T_{max}}{T_u} \times L \right\rceil.$$

In this case the elements of the frequency autocorrelation matrix $R_f$ of equation (15) may match the frequency autocorrelation $r_f$ of equation (13).

For a dual narrow channel impulse response profile 1202 as shown in FIG. 12 and matching better to a single frequency network, the diagonal matrix $\overline{D}$ may be given as $$\overline{D} = \frac{L}{(L_0 + L_1)} \times \quad (18)$$

$$\frac{\text{diag}\{\underbrace{1, \ldots, 1}_{L_0 \text{ elements}(T_1-T_0)}, 0, \ldots, 0, \underbrace{1, \ldots, 1}_{L_1 \text{ elements}(T_{max}-T_2)}, 0, \ldots, 0\}}{\underbrace{\phantom{XXXXXXXXXXXXXXXXXXXXXXXXXXXXXX}}_{L_2 \text{ elements}(T_{max})}}$$
$$\underbrace{\phantom{XXXXXXXXXXXXXXXXXXXXXXXXXXXXXXXXXXX}}_{L \text{ elements}(T_u)}$$

where $L_0 = \left\lceil \frac{T_1-T_0}{T_u} \times L \right\rceil$ and $L_1 = \left\lceil \frac{T_{max}-T_2}{T_u} \times L \right\rceil$.

Although illustrative embodiments of the invention have been described in detail herein with reference to the accompanying figures, it is to be understood that the invention is not limited to those precise embodiments. The embodiments described herein are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. An apparatus in a multiple sub-carrier digital communication receiver, the apparatus including:
    a first channel estimation block that calculates a first set of channel estimates at a sub-carrier frequency;
    a second channel estimation block that calculates a second set of channel estimates at the sub-carrier frequency using the first set of channel estimates and a plurality of sets of Wiener filter coefficients, each set of Wiener filter coefficients generated at one of a plurality of Doppler frequency bandwidths; and
    a Doppler frequency selection block that selects one of the plurality of Doppler frequency bandwidths as a Doppler frequency estimate based on comparing the first set of channel estimates with the second set of channel estimates.

2. The apparatus of claim 1 wherein the first channel estimation block calculates the first set of channel estimates at the sub-carrier frequency using a pre-determined set of transmit pilot symbols.

3. The apparatus of claim 2 wherein the first channel estimation block calculates the first set of channel estimates at the sub-carrier frequency using the pre-determined set of transmit pilot symbols from a series of OFDM symbols spaced regularly in time.

4. The apparatus of claim 3 wherein the first channel estimation block further calculates an estimate in the first set of channel estimates by dividing an FFT output, at the sub-carrier frequency, of a first OFDM symbol in the series of OFDM symbols by a transmit pilot symbol expected for the first OFDM symbol from the pre-determined set of transmit pilot symbols.

5. The apparatus of claim 4 wherein the second channel estimation block further calculates an estimate in the second set of channel estimates at the sub-carrier frequency for the first OFDM symbol from the series of OFDM symbols using a subset of channel estimates from the first set of channel estimates based on a subset of OFDM symbols from the series of OFDM symbols that excludes the first OFDM symbol.

6. The apparatus of claim 5 wherein the second channel estimation block further calculates the estimate in the second set of channel estimates by a Wiener filter interpolation of the subset of channel estimates from the first set of channel estimates using a set of Wiener filter coefficients generated for a Doppler frequency bandwidth from the plurality of Doppler frequency bandwidths.

7. The apparatus of claim 6 wherein the Doppler frequency selection block calculates an interpolation error for the Doppler frequency bandwidth at the sub-carrier frequency in the OFDM symbol by determining a magnitude difference between the estimate in the second set of channel estimates and the estimate in the first set of channel estimates.

8. The apparatus of claim 7 wherein the Doppler frequency selection block further calculates an average interpolation error for the Doppler frequency bandwidth at the sub-carrier frequency for the series of OFDM symbols by averaging over a set of interpolation errors, each interpolation error in the set of interpolation errors calculated for an OFDM symbol in the series of OFDM symbols.

9. The apparatus of claim 7 wherein the Doppler frequency selection block further calculates an accumulated interpolation error for the Doppler frequency bandwidth at the sub-carrier frequency for the series of OFDM symbols by accumulating over a set of interpolation errors, each interpolation error in the set of interpolation errors calculated for an OFDM symbol in the series of OFDM symbols.

10. The apparatus of claim 8 wherein the Doppler frequency selection block selects as the Doppler frequency estimate the Doppler frequency bandwidth with the smallest average interpolation error.

11. The apparatus of claim 9 wherein the Doppler frequency selection block selects as the Doppler frequency estimate the Doppler frequency bandwidth with the smallest accumulated interpolation error.

12. A Doppler frequency estimation method in a multiple sub-carrier digital communication receiver, the method including:
  calculating a first set of channel estimates at a sub-carrier frequency;
  calculating a second set of channel estimates at the sub-carrier frequency using the first set of channel estimates and a plurality of sets of Wiener filter coefficients, each set of Wiener filter coefficients generated at one of a plurality of Doppler frequency bandwidths; and
  using a receiver, selecting a Doppler frequency estimate from the plurality of Doppler frequency bandwidths by comparing the first set of channel estimates to the second set of channel estimates.

13. The method of claim 12 wherein calculating the first set of channel estimates at the sub-carrier frequency uses a pre-determined set of transmit pilot symbols.

14. The method of claim 13 wherein calculating the first set of channels estimates at the sub-carrier frequency uses the pre-determined set of transmit pilot symbols from a series of OFDM symbols spaced regularly in time.

15. The method of claim 14 wherein calculating the first set of channel estimates further includes calculating a first channel estimate, at the sub-carrier frequency of an OFDM symbol in the series of OFDM symbols, by dividing an FFT output at the sub-carrier frequency by a transmit pilot symbol from the pre-determined set of transmit pilot symbols.

16. The method of claim 15 wherein calculating the second set of channel estimates further includes calculating a second channel estimate, at the sub-carrier frequency of the first OFDM symbol in the series of OFDM symbols, by using a subset of the first set of channel estimates that excludes the first channel estimate.

17. The method of claim 16 wherein calculating the second channel estimate at the sub-carrier frequency in the first OFDM symbol includes interpolating with a Wiener filter the subset of the first set of channel estimates using a set of Wiener filter coefficients generated for a Doppler frequency bandwidth from the plurality of Doppler frequency bandwidths.

18. The method of claim 17 wherein selecting a Doppler frequency estimate at the sub-carrier frequency in the first OFDM symbol includes:
  calculating an interpolation error, for each Doppler frequency bandwidth in the plurality of Doppler frequency bandwidths, by determining a magnitude difference between the second channel estimate and the first channel estimate.

19. The method of claim 18 wherein selecting the Doppler frequency estimate further includes calculating an average interpolation error, for each Doppler frequency in the plurality of Doppler frequency bandwidths, by averaging the interpolation errors calculated at a sub-carrier frequency for a series of OFDM symbols.

20. The method of claim 18 wherein selecting the Doppler frequency estimate further includes calculating an accumulated interpolation error, for each Doppler frequency in the plurality of Doppler frequency bandwidths, by accumulating the interpolation errors calculated at a sub-carrier frequency for a series of OFDM symbols.

21. The method of claim 19 wherein selecting the Doppler frequency estimate further includes selecting as the Doppler frequency estimate the Doppler frequency bandwidth with the smallest average interpolation error.

22. The method of claim 20 wherein selecting the Doppler frequency estimate further includes selecting as the Doppler frequency estimate the Doppler frequency bandwidth with the smallest accumulated interpolation error.

* * * * *